United States Patent [19]

Kreuer et al.

[11] Patent Number: 4,513,069
[45] Date of Patent: Apr. 23, 1985

[54] GALVANIC CELL COMPRISING SOLID PROTON CONDUCTOR AS ELECTROLYTE

[75] Inventors: Klaus-Dieter Kreuer, Böblingen; Werner Weppner; Albrecht Rabenau, both of Stuttgart, all of Fed. Rep. of Germany

[73] Assignee: Max-Planck-Gesellschaft zur Foederung der Wissenschaften e.V., Gottingen, Fed. Rep. of Germany

[21] Appl. No.: 396,954

[22] Filed: Jul. 9, 1982

[30] Foreign Application Priority Data

Jul. 14, 1981 [DE] Fed. Rep. of Germany ....... 3127820

[51] Int. Cl.³ ............................................. H01M 6/18
[52] U.S. Cl. .................................... 429/192; 429/218; 429/193; 252/62.2; 252/518; 252/521; 204/421
[58] Field of Search ................................ 429/191–193, 429/33, 46; 252/62.2, 518, 521; 204/295, 421

[56] References Cited

U.S. PATENT DOCUMENTS

| | | | |
|---|---|---|---|
| 3,266,940 | 8/1966 | Caesar | 429/33 |
| 3,497,394 | 2/1970 | Berger | 204/295 X |
| 4,024,036 | 5/1977 | Nakamura et al. | 429/193 X |
| 4,179,491 | 12/1979 | Howe et al. | 429/191 X |
| 4,197,365 | 4/1980 | Farrington et al. | 429/193 |
| 4,206,088 | 6/1980 | Inoue et al. | 252/62.2 X |
| 4,252,874 | 2/1981 | Farrington et al. | 429/193 |

*Primary Examiner*—Anthony Skapars
*Attorney, Agent, or Firm*—Felfe & Lynch

[57] ABSTRACT

A galvanic cell is described, having a metal oxide or metal sulfide electrode and a metal electrode, and between them an electrolyte or separator, which is characterized by the fact that it contains as electrolyte a solid proton conductor, namely a zeolite having a proton-containing cation, which has in its crystal lattice passages a phase promoting proton transport.

16 Claims, 1 Drawing Figure

EXAMPLE OF A DISCHARGE CURVE:

Cathode: Iron (Fe)
Anode: 92% $MnO_2$, 8% Graphite
Electrolyte: $NH_4$-zeolite A, 14.5% $H_2O$
Area: 1 cm²
Open Cell Voltage: .72 V
Discharge Resistance: 5 x 10³ ohms

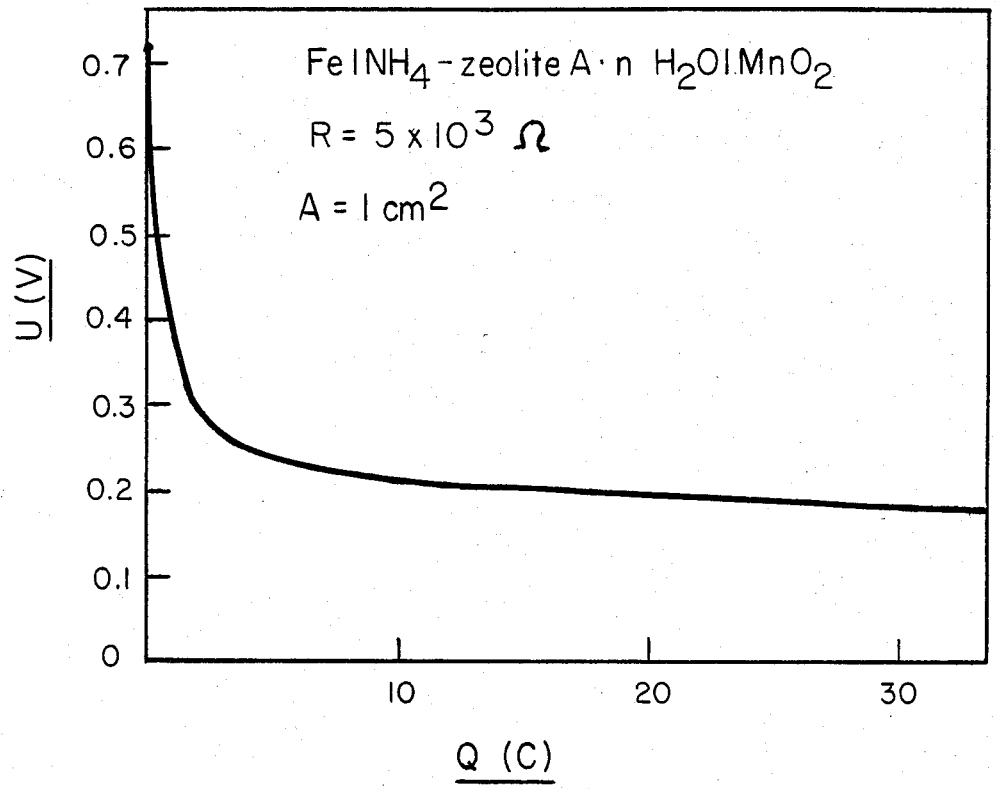
EXAMPLE OF A DISCHARGE CURVE:
Cathode: Iron (Fe)
Anode: 92% $MnO_2$. 8% Graphite
Electrolyte: $NH_4$-zeolite A. 14.5% $H_2O$
Area: 1 cm$^2$
Open Cell Voltage: .72 V
Discharge Resistance: 5 x 10$^3$ ohms

GALVANIC CELL COMPRISING SOLID PROTON CONDUCTOR AS ELECTROLYTE

DESCRIPTION

The invention relates to a galvanic cell, namely a primary cell or a secondary cell or an electrochemical cell, having a metal oxide or metal sulfide electrode and a metal electrode, and between them an electrolyte or separator.

Galvanic cells having a metal oxide electrode and a metal electrode, and an electrolyte between them, have long been known. These known galvanic cells, however use liquid electrolytes (e.g., alkali metal hydroxide solutions). On account of their state and especially on account of their corrosiveness, these liquid electrolytes are disadvantageous. In particular, there is a need for the use of solid electrolytes which create no corrosion problems.

Electrochromic display cells are known, which have a metal oxide electrode and a metal electrode and between them a solid proton conductor of hyrogenuranylphosphate tetrahydrate ($HUO_2PO_4.4H_2O$) (T. Takahashi et al, Journal of Applied Electrochemistry 10 (1980) 415–416). These electrochromic cells, which are used as display elements, are not, however, suitable as galvanic cells or accumulators.

It is furthermore known to use proton-conducting electrolytes in fuel cells (T. Takahashi et al., Int. I. Hydrogen Energy, Vol. 4 (1979) 327–338).

Lastly, galvanic cells are known on the basis of hydrogen concentration cells which have solid electrolytes made of hydrogenuranylphosphate tetrahydrate (P. E. Childs et al., Journal of Power Sources 3 (1978), 105–114).

In all these cases, use has been made exclusively of the proton-conducting property of the separator material. It has, however, been shown that nearly all good proton conductors simultaneously have a high diffusion coefficient for water and comparable classes of substances, which is what makes possible the "galvanic cell" of the invention. In such a cell the protons move from the cathode to the anode, whereas the water molecules (or other material, such as $H_2S$) are transported in the opposite direction.

Now, it is the object of the present invention to create galvanic cells of the kind described above, which will have a solid electrolyte or separator which, despite a high proton conductivity, involves no corrosion problems and provides galvanic cells of high output and long life.

This object is achieved in accordance with the invention by a galvanic cell having a metal oxide or metal sulfide electrode and a metal electrode and between them a separator, which is characterized in that it contains a solid proton conductor as electrolyte.

The subject matter of the invention is therefor a galvanic cell having a metal oxide or metal sulfide electrode and a metal electrode, and between them a solid proton conductor which acts as the electrolyte.

The solid proton conductors of the galvanic cell of the invention can be one of the known proton conducting substances, such as $H_3X_{22}PO_{40}.29H_2O$ (wherein X represents Mo or W), $H_8UO_2(JO_6).4H_2O$, $HUO_2AsO_4.4H_2O$, $HUO_2PO_4.4H_2O$, $(H_2O)_n(H_3O)\beta''$-aluminum oxide, $(H_2O)_n(H_3O)(NH_4)\beta''$-aluminum oxide, $H_3OClO_4$, $Sb_2O_5.4H_2$, $(H_3O)Al_3(SO_4)(OH)_6.nH_2O$ and $SnO_2.2,3H_2O$. Preferably, the galvanic cell of the invention, however, includes as solid proton conductor a proton-containing zeolite having cations, which contains in its crystal lattice passages a phase which promotes proton transport. Since the zeolites have a tendency toward ion exchange, a series of cations or cation combinations can be installed in the crystal structure, including protons, which are not mobile in such structures, but are tightly bound to the oxygen atoms with the formation of hydroxyl groups. It has not surprisingly been found that if proton-containing cations on the basis of a basic phase such as water, ammonia, organic amines and the like, are introduced into the lattice of the zeolite, the protons are transported by means of these proton-containing cations in accordance with the diffusion coefficient of the basic phase. What is involved is a translatory movement of complex, proton-containing cations, such as $H_3O^+$, $NH_4^+$, $N_2H_5^+$, $H^+$-pyridine, $CH_3NH_3^+$, etc., which form from the basic phase ($H_2O$, $NH_3$, $N_2H_4$, pyridine, $CH_3NH_2$ etc.) and the proton ($H^+$) transported thereby. In this manner the protons are bound to the basic phase and can be transported on it. The mobility can be very low if the basic phase is very much smaller than the passages in the zeolitic structure. The mobility can, however, be considerably increased by the addition of another phase, namely a phase promoting proton transport (e.g., water, methanol, ethanol or the like), so that in this manner a material is obtained which at room temperature has a proton conductivity of more than $10^{-3} ohm^{-1}.cm^{-1}$. It has been found that these proton-conducting zeolites are especially well suited as electrolytes or separators for galvanic cells, namely primary cells and secondary cells, since the material does not give rise to corrosion problems and can be formed very easily by pressing or sintering into resistant bodies of stable dimensions with which it is possible to produce galvanic cells of high output and long life.

In a preferred embodiment of the invention, one uses as the electrolyte a zeolite in the ammonium form, which contains in its crystal lattice passages a phase which promotes proton transport, the zeolite having preferably a crystal diameter greater than 0.16 nm.

In a still more preferred embodiment of the invention, a zeolite is used which has in its zeolitic structure six-member and larger rings as secondary structural groups. Reference is made with regard to the structure of zeolites to R. M. Barrer "Zeolites and Clay Minerals as Sorbents and Molecular Sieves", Academic Press, London, New York, San Francisco (1978) and Friedrich Schwochow et al, "Zeolithe-Herstellung, Struktur, Anwendung", Angewandte Chemie, Vol. 87 (1975) No. 18, pages 659–667. In these publications it is stated that the zeolitic structure can best be described by means of eight secondary structural groups, comprising four-member rings (4), six-member rings (6), eight-member rings (8), double four-member rings (4-4), double six-member rings (6-6) and complex secondary groups (4-1, 5-1 and 4-4-1).

It has been found that the zeolites which have six-member rings and larger rings are especially suitable in accordance with the invention. These include especially the zeolites of the analcime group, of the chabazite group, of the phillipsite group and of the faujasite group. Especially preferred according to the invention are the solid proton conductors of the group comprising K-analcime.nL, K-phillipsite.nL, K-gismondine.nL, K-zeolite omega.nL, K-zeolite L.nL, K-sodalite.nL, Kzeolite X.nL, K-zeolite Y.nL, K-zeolite A.nL and K-zeolite ZK-5.nL, wherein K represents $NH_4^+$, $N_2H_5^+$, $H^+$-organic amine, or $H_3O^+$ (in addition to other cations or exclusively) and L represents $H_2O$ or an aliphatic or cycloaliphatic alcohol of low molecular weight having not more than 6 carbon atoms.

These zeolites contain in the crystal lattice passages of the zeolite a mobile phase, namely the phase promoting proton transport, whose amount is preferably less than the amount that is necessary for the filling up of the crystal lattice passages accessible to the mobile phase in the zeolitic structure. For it has been found that a surprisingly much higher conductivity can be achieved if, contrary to what has heretofore been assumed, not more than the amount of a phase, water for example, that is necessary for the filling up of the lattice passages is present. According to a preferred embodiment of the invention, the phase promoting proton transport is present in an amount sufficing for the formation of a monomolecular layer on the crystallite surfaces of the zeolite. This can be achieved by sintering the zeolite converted to the ammonium form, at temperatures of 500°–600° C., in vacuo, if desired, and then bringing it back into equilibrium with the phase promoting proton transport.

The phase promoting proton transport must have a diffusion coefficient of at least $10^{-15}$ cm$^2$.s$^{-1}$. Materials especially preferred for this purpose are water, methanol or ethanol.

The solid proton conductors used preferentially in accordance with the invention contain as proton-containing cations preferably cations on the basis of ammonia, hydrazine or an organic amine, preferably of an aliphatic, cycloaliphatic or aromatic amine of low molecular weight having 1 to 6 carbon atoms, such as especially methylamine, ethylamine or pyridine and, as the phase promoting proton transport, preferably a polar phase, and more preferably water and/or alcohol. Especially preferred as solid proton conductors are zeolites containing ammonium ions as proton-containing cations, and water as the phase promoting proton transport.

The galvanic cells of the invention distinguish themselves from the conventional elements using liquid electrolytes by the fact that they have greater mechanical stability, and that changes in the electrode materials during operation are reversible, since the reaction products remain in place.

The invention will be further explained below with reference to the following examples.

EXAMPLE 1

Preparation of a proton-conducting zeolite 5 g of type A zeolite of the approximate composition $Na_4Ca_4Al_{12}Si_{12}O_{48}$ (Linde Molecular Sieve 5A, pseudocubic a=1.242 nm) is placed in 250 ml of a saturated aqueous ammonium carbonate solution. In an exothermic reaction, ammonium ions are exchanged for approximately 50% of the sodium ions overnight with constant stirring, approximately 14.5 weight-percent of water being simultaneously absorbed. The reaction product (whose approximate composition is $(NH_4)_2Na_2Ca_2Al_{12}Si_{12}O_{48}.nH_2O$) is filtered out, dried in air and stored over water at room temperature. The material is a proton conductor having a conductivity at room temperature of $2 \times 10^{-3}$ ohm$^{-1}$.cm$^{-1}$. The material can be compression-molded very easily in an excess of water, alcohol and the like.

EXAMPLE 2

Galvanic cells are prepared using proton-conducting zeolite made in accordance with Example 1, pressed to form a disk having a diameter of 8 mm and a thickness of 5 mm. Electrodes are used having a diameter also of 8 mm and a thickness of 1 mm. The disks obtained in this manner are clamped together by means of two steel screws in an acrylic glass casing. The galvanic cells prepared in this manner are listed in the following table.

TABLE

| Electrode Pair | Cell voltage (V) | Short-circuit current ($\mu$A) | Remarks |
| --- | --- | --- | --- |
| $MnO_2$ (8% graphite)/Fe | 0.7–1.2 | 60 | reversible |
| $MnO_2$ (8% graphite)/Sn | 0.86 | 40 | reversible |
| $MnO_2$ (8% graphite)/Al(Hg) | 1.3 | 20 | not yet determined |
| $MnO_2$ (8% graphite)/Zn | 1.5 | 400 | reversible |
| $PbO_2$ (8% graphite)/Zn | 1.7 | 2500 | reversible |
| $PbO_2$ (8% graphite)/Al(Hg) | 1.5 | 50 | not yet determined |
| $PbO_2$ (8% graphite)/Cd | 1.3 | 700 | not yet determined |
| $PbO_2$ (8% graphite)/Pb | 1.1 | 100 | not yet determined |
| $NiO_2$/Zn | 1.4 | 200 | not yet determined |
| $Co_2O_3$/Zn | 0.7 | 250 | not yet determined |
| $TiS_2$/Zn | 0.72 | 2000 | not yet determined |
| $MoS_2$/Zn | 1.45 | 2500 | not yet determined |

The beginning of the discharge curve of the $MnO_2$/Fe cell is represented in the appended drawing. It can be seen that this galvanic cell of the invention has a very good discharge curve.

In accordance with the invention it is furthermore possible to sinter the proton-conducting zeolites at 300° C. with the yielding of water, because, when they have returned to equilibrium with water, they recover their original proton conductivity. The same applies to materials which are sintered at 600° C. with the yielding of water and ammonia. The sintered compacts thus obtained are relatively resistant to attrition and mechanically much more stable than products sintered at 300° C. By restoring equilibrium over an ammonia solution at room temperature the proton conductivity of the starting material is recovered.

We claim:

1. In a galvanic cell having a metal oxide or metal sulfide electrode, a metal electrode, and between them an electrolyte, the improvement wherein said electrolyte is a solid proton conductor comprising zeolites having proton-containing cations and having six-membered rings and/or larger rings as secondary structural groups of the zeolitic structure, and having in the crystal lattice passages of said zeolites, a phase which promoter proton transport.

2. The galvanic cell of claim 1 wherein said zeolite has a crystal lattice passage diameter of more than 0.16 nm.

3. The galvanic cell of claim 1 wherein said phase promoting proton transport is a polar phase.

4. The galvanic cell of claim 1 wherein said phase promoting proton transport is present in an amount which in addition to filling the lattice passages is sufficient to form a monomolecular coating on the crystal surfaces.

5. The galvanic cell of claim 1 wherein said proton transport promoting phase is present in an amount which is less than the amount necessary to fill the crystal lattice passages of the zeolitic structure which are accessible to this phase.

6. The galvanic cell of claim 1 wherein said proton transport promoting phase has a diffusion coefficient of at least $10^{-15}$ cm$^2$s$^{-1}$.

7. The galvanic cell of claim 1 wherein said zeolite has, as proton-containing cations, ammonium cation (NH$_3^+$), hydronium cations (H$_3$O$^+$), hydrazinium cations (N$_2$H$_5^+$) or organic amine cations.

8. The galvanic cell of claim 7 wherein said organic amine cation is a cation based on at least one aliphatic, cycloaliphatic or aromatic amine of low molecular weight of 1 to 6 carbon atoms.

9. The galvanic cell of claim 8 wherein said amine is methylamine, ethylamine or pyridine.

10. The galvanic cell of claim 1 wherein said zeolite contains water, dimethylsulfoxide and/or an alcohol as the proton transport promoting phase.

11. The galvanic cell of claim 10 wherein said zeolite contains as alcohol at least one aliphatic alcohol of low molecular weight having 1 to 6 carbon atoms.

12. The galvanic cell of claim 11 wherein said alcohol is methanol or ethanol.

13. The galvanic cell of claim 1 wherein said zeolite is zeolite analcime, zeolite L, zeolite A, zeolite X, zeolite Y.

14. The galvanic cell of claim 1 wherein said anode is an oxide or sulfide of a transition metal and said cathode is a base metal.

15. The galvanic cell of claim 14 wherein said anode is formed of carbonaceous or noncarbonaceous MnO$_2$, carbonaceous or noncarbonaceous PbO$_2$, NiO$_2$, Co$_2$O$_3$, TiS$_2$ or MoS$_2$ and said cathode is formed of iron, tin, aluminum, aluminum combined with mercury, zinc, cadmium or lead.

16. The galvanic cell of claim 13 wherein said zeolite is zeolite A.

* * * * *